(12) United States Patent
Marche et al.

(10) Patent No.: US 8,517,305 B2
(45) Date of Patent: Aug. 27, 2013

(54) AIRCRAFT ENGINE ATTACHMENT PYLON COMPRISING A BOX WITH A CIRCULAR OR ELLIPTICAL SHAPED SECTION

(75) Inventors: Jacques Herve Marche, Toulouse (FR); Fabien Raison, Plaisance Du Touch (FR)

(73) Assignee: Airbus Operations S.A.S., Toulouse (FR)

(*) Notice: Subject to any disclaimer, the term of this patent is extended or adjusted under 35 U.S.C. 154(b) by 249 days.

(21) Appl. No.: 12/989,589

(22) PCT Filed: May 12, 2009

(86) PCT No.: PCT/FR2009/050861
§ 371 (c)(1),
(2), (4) Date: Oct. 25, 2010

(87) PCT Pub. No.: WO2009/147342
PCT Pub. Date: Dec. 10, 2009

(65) Prior Publication Data
US 2011/0036943 A1    Feb. 17, 2011

(30) Foreign Application Priority Data
May 14, 2008    (FR) ..................... 08 53116

(51) Int. Cl.
*B64D 27/00*    (2006.01)
(52) U.S. Cl.
USPC .............. 244/54; 244/55; 244/53 R

(58) Field of Classification Search
USPC ............... 244/55, 54, 53 R; 60/796, 797
See application file for complete search history.

(56) References Cited

U.S. PATENT DOCUMENTS

| | | | | |
|---|---|---|---|---|
| 4,055,041 A * | 10/1977 | Adamson et al. | ........... | 60/226.1 |
| 4,266,741 A | 5/1981 | Murphy | | |
| 5,347,884 A * | 9/1994 | Garnjost et al. | ........... | 74/570.2 |
| 5,524,847 A * | 6/1996 | Brodell et al. | ........... | 244/54 |
| 7,784,733 B2 * | 8/2010 | Diochon et al. | ........... | 244/54 |
| 7,971,825 B2 * | 7/2011 | Diochon et al. | ........... | 244/54 |
| 2008/0191088 A1 * | 8/2008 | Diochon et al. | ........... | 244/54 |
| 2009/0084893 A1 * | 4/2009 | Balk | ........... | 244/54 |
| 2009/0212155 A1 * | 8/2009 | Huggins et al. | ........... | 244/54 |
| 2011/0036942 A1 * | 2/2011 | Marche et al. | ........... | 244/54 |

FOREIGN PATENT DOCUMENTS

| | | |
|---|---|---|
| GB | 2 021 696 | 12/1979 |
| GB | 2 275 984 | 9/1994 |

OTHER PUBLICATIONS

U.S. Appl. No. 12/989,430, filed Oct. 25, 2010, Marche, et al.
International Search Report issued Dec. 30, 2009 in PCT/FR09/50861 filed May 12, 2009.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An engine attachment pylon for an aircraft, including a rigid structure including a box formed by one or plural hollow segments. The section of at least one hollow segment is circular or elliptical in shape.

20 Claims, 4 Drawing Sheets

AIRCRAFT ENGINE ATTACHMENT PYLON COMPRISING A BOX WITH A CIRCULAR OR ELLIPTICAL SHAPED SECTION

TECHNICAL FIELD

This invention relates in general to an engine attachment pylon for an aircraft such as a turbojet. This type of attachment pylon is also called an EMS (Engine Mounting Structure), and for example can be used to suspend the turbojet below the aircraft wing, using an assembly system comprising a plurality of engine attachments.

STATE OF PRIOR ART

Such an attachment pylon is designed to form an attachment interface between an engine such as a turbojet and the aircraft wing. It transmits forces generated by its associated turbojet to the structure of this aircraft, and it also enables routing of fuel, electrical, hydraulic and air systems between the engine and the aircraft.

In order to transmit forces, the pylon comprises a rigid structure, also called the primary structure, frequently of the "box" type, formed by the assembly of upper and lower spars and two lateral panels, preferably through bolt type attachment means, connecting them to transverse ribs located in an inner space within the box. Therefore the cross-section through this box is normally square or rectangular in shape.

The disadvantage of such a solution lies in the difficulty of achieving a satisfactory compromise between making the box small enough to limit the drag generated within the secondary flow in which it is immersed, and large enough to transmit engine forces to the aircraft fuselage.

SUMMARY OF THE INVENTION

Therefore, the purpose of the invention is to propose an aircraft engine attachment pylon at least partially overcoming the disadvantage mentioned above related to embodiments according to prior art, and also to present an engine assembly for an aircraft with at least one such pylon.

To achieve this, the object of the invention is an aircraft engine attachment pylon, said pylon comprising a rigid structure provided with a box formed by means of one or several hollow segments. According to the invention, the section of at least one hollow segment is elliptical or circular in shape.

Thus, the invention discloses a design that is radically different from that usually used for rigid attachment pylon structures, since it is rounded in shape, and more specifically it has a circular or elliptical section. This shape was selected because of the resulting compactness, and also for its very good mechanical properties due in particular to the high modulus of inertia in the three principal directions orthogonal to each other, these three principal directions corresponding to the main loading modes that are vertical bending, lateral bending and torsion. Consequently, this innovative solution advantageously offers a satisfactory compromise between the box being small enough to limit the drag generated by the secondary flow in which this box is immersed, and large enough to transmit engine forces to the aircraft fuselage.

Preferably, at least one hollow segment is approximately in the shape of a tapered and truncated cone or is approximately cylindrical, with the cross-section being elliptical or circular in shape. Naturally, this type of segment could be combined with another segment of any arbitrary shape.

Preferably, the pylon comprises several hollow segments connected to each other at their forward and aft ends.

In this case, at least one hollow segment has at least one of its forward and aft ends in the form of an attachment flange projecting outwards from a space inside the box. Obviously, this flange is preferably intended to be connected to a similar flange placed facing it on the adjacent segment of the box.

Preferably, two adjacent hollow segments are assembled to each other through their two facing attachment flanges bearing on each other, and fixed by attachment means outside said space inside the box.

This solution also differs from solutions according to prior art with a rectangular or square cross-section in which several accesses to the inside of the box are usually provided to install and assemble the attachment means for the components of this box. For example, these accesses may be in the form of "doors" or "openings" formed on the spars and the panels. Nevertheless, regardless of the adopted design, access for the operator is always difficult, which increases assembly and manufacturing times.

On the other hand, the adopted pylon design no longer requires any access inside the box to put said attachment means into place, since the portions to be assembled are located outside the space inside the box. Consequently, the assembly time is advantageously shortened, particular because the work to be done by the operator performing the task is made easier.

Note that the box is preferably provided without any internal ribs, even if such ribs may be provided without going outside the framework of the invention. However, forward and aft box closing ribs can be used conventionally, located on the opposite longitudinal ends of this box and therefore remaining easily accessible for the operator who will fix them.

Preferably, said attachment means are bolts or rivets.

Also preferably, the pylon comprises a hollow forward tapered and truncated segment with a circular cross-section, and a central hollow segment supporting said forward segment, the central hollow segment being approximately cylindrical in section in the form of an ellipse with an inclined axis intersecting the axis of said forward segment. This configuration facilitates the junction between the two segments. It also makes it possible to use an elliptical cross-section for the main segment and therefore to orient the major axis of the ellipse along the direction of maximum load applied to the box, which is usually in the direction of the height.

Finally, said inner space may be in the form of a duct through which compressed air can pass, preferably drawn off from the engine, and that will supply the inside of the aircraft, for example to satisfy aircraft pressurisation needs. Alternatively, a compressed air duct could be routed through the inner space in the box.

Another purpose of the invention is an engine assembly for an aircraft with an engine and an engine attachment pylon like that described above. Finally, another purpose of the invention is an aircraft comprising at least one such engine assembly.

Other advantages and characteristics of the invention will become clear after reading the detailed non-limitative description given below.

BRIEF DESCRIPTION OF THE DRAWINGS

This description will be made with reference to the appended drawings wherein.

DETAILED DESCRIPTION OF PREFERRED EMBODIMENTS

Figure 1:
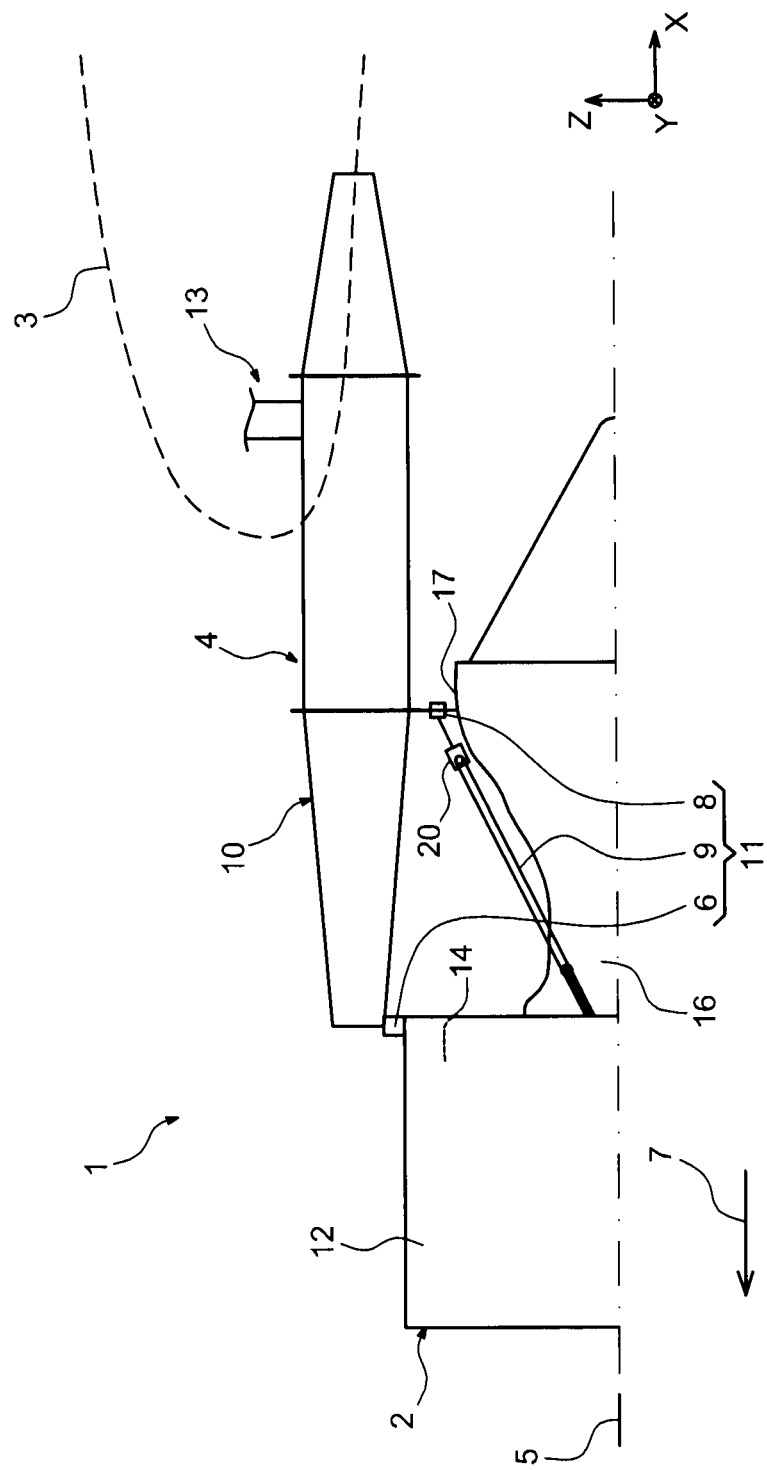
FIG. 1 shows a diagrammatic side view of an aircraft engine assembly, according to one preferred embodiment of this invention.

FIG. 1 shows an engine assembly 1 for an aircraft designed to be fixed under a wing 3 of this aircraft, this assembly 1 provided with an attachment pylon 4 being in the form of a preferred embodiment of this invention.

Globally, the engine assembly 1 comprises an engine such as a turbojet 2 and the attachment pylon 4, the attachment pylon in particular being provided with a rigid structure 10 and an assembly system 11 comprising a plurality of engine attachments 6, 8 and a device for resistance of thrusts 9 generated by the turbojet 2, therefore the assembly system 11 being inserted between the engine and the above-mentioned rigid structure 10 also called the primary structure. Note that the assembly 1 is intended to be surrounded by a pod (not shown) and that the attachment pylon 4 comprises another series of attachments 13 used to suspend this assembly 1 under the aircraft wing, being connected to a forward spar (not shown) of this wing.

By convention, throughout the following description, the X direction denotes the longitudinal direction of the pylon 4 that can also be considered to be the longitudinal direction of the turbojet 2, this X direction being parallel to a longitudinal axis 5 of this turbojet 2. Furthermore, the direction transverse to the pylon 4 is denoted Y and can be considered to be the same as the transverse direction of the turbojet 2, and Z is the vertical direction or the height, these three X, Y and Z directions being orthogonal to each other.

Furthermore, the terms "forward" and "aft" should be considered with respect to a direction of movement of the aircraft that occurs as a result of the thrust applied by the turbojet 2, this direction being shown diagrammatically by the arrow 7.

In FIG. 1, it can be seen that only the thrust resistance device 9, engine attachments 6, 8 and the rigid structure 10 of the attachment pylon 4 are shown. The other components of this pylon 4, such as the attachment means of the rigid structure 10 under the aircraft wing, or the secondary structure for segregation and maintenance of systems while supporting aerodynamic fairings, are not shown.

The turbojet 2 is provided with a large fan casing 12 at the forward end delimiting an annular fan duct 14, and being provided near the aft end with a smaller central casing 16 enclosing the core of this turbojet. Finally, the central casing 16 is prolonged in the aft end by an ejection casing 17 that is larger than the casing 16. Obviously, the casings 12, 16 and 17 are rigidly fixed to each other.

As can be seen in FIG. 1, the plurality of engine attachments is composed of a forward engine attachment 6 and an aft engine attachment 8 possibly forming two aft half-attachments as known in prior art. The thrust resistance device 9 comprises in particular two lateral thrust resistance rods (only one of which is shown in FIG. 1 because the figure shows a side view) connected firstly to a forward part of the central casing 16 at their forward ends, and secondly to a spreader beam 20 at their aft ends, this spreader beam itself being mounted on the rigid structure 10 or on an aft attachment body as shown.

The forward engine attachment 6, fixed to the fan casing 12, is conventionally designed so that it can resist only forces generated by the turbojet 2 along the Y and Z directions, and therefore not forces applied along the X direction. Note that this forward attachment 6 preferably penetrates into an upper circumferential end piece of the fan casing 12.

The aft engine attachment 8 is globally inserted between the ejecting casing 17 and the rigid structure 10 of the pylon. As mentioned above, it is preferably designed so as to be able to resist forces generated by the turbojet 2 along the Y and Z directions, but not forces applied along the X direction.

Thus, with the statically determinate assembly system 11, forces applied along the X direction are resisted by the device 9, and forces applied along the Y and Z directions are resisted by the forward attachment 6 and the aft attachment 8 acting in combination.

Also, the moment applied about the X direction is resisted vertically by means of the attachment 8, the moment applied about the Y direction is resisted vertically by means of the aft attachment 8 jointly with attachment 6, and the moment applied about the Z direction is resisted transversely by means of the attachment 8, jointly with the attachment 6.

FIGS. 2 to 4c show the design of the rigid structure 10 of the attachment pylon, also referred to as the primary structure. Globally, it is composed of a box 24 extending over the entire length of the rigid structure 10 along the X direction, and therefore forms a torsion box.

Figure 4A:
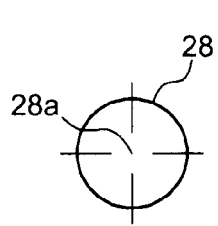
FIGS. 4a to 4c are sectional views taken along lines IVa-IVa to IVc-IVc in FIG. 3 respectively.

The box is composed of several hollow segments, in this case three adjacent segments 28, 30, 32. The first of these segments is tapered and truncated, with its axis 28a corresponding to the axis of revolution. Its forward end is preferably designed to support the forward engine attachment 6. The section orthogonal to the axis 28a is in the shape of a circle as shown in FIG. 4a. Thus, the size of this circle reduces towards the forward end due to the reduction in size of the tapered and truncated segment along this direction.

Figure 4B:
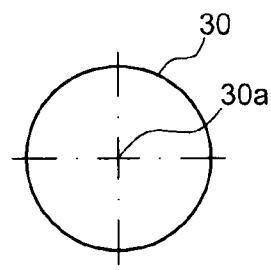

The second hollow segment 30 called the central segment is approximately cylindrical with its axis 30a preferably being coincident with the axis 28a. Its forward end, fixed to the aft end of the first segment 28, is preferably designed to support the aft engine attachment 8. The section orthogonal to the axis 30a is in the shape of a circle as shown in FIG. 4b. Preferably, to facilitate assembly of segments 28 and 30 to each other, the diameter close to the forward end of the second segment 30 is very similar to the design of the first segment 28 close to its aft end.

Figure 4C:
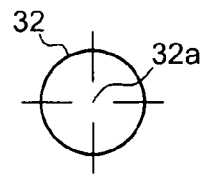

Finally, the third segment is tapered and truncated, with its axis 32a corresponding to the axes 28a and 30a and therefore also corresponding to the axis of revolution. The section orthogonal to the axis 32a is in the shape of a circle as shown in FIG. 4c. Thus, the size of this circle reduces towards the aft end due to the reduction in size of the tapered section along this direction, which is perfectly adapted to the narrowing of the pylon is this aft part. Preferably, to facilitate assembly of segments 30 and 32 to each other, the diameter close to the aft end of the second segment 30 is very similar to the design of the third segment 32 close to its forward end.

Note that although the coaxial segments have been described as having a constant or varying circular cross-section, an elliptical cross-section would also be possible without going outside the scope of this invention, even for significantly tapered sections. Similarly, the segments are not necessarily coaxial, although they preferably have intersecting axes depending on the needs encountered.

Each segment may be made from a composite material, for example using the composite winding technique, or even by Resin Transfer Molding.

The outer surface of the box 24 is also used as a housing for the installation of normal systems such as hydraulic and/or electrical systems on the pylon.

Figure 3:
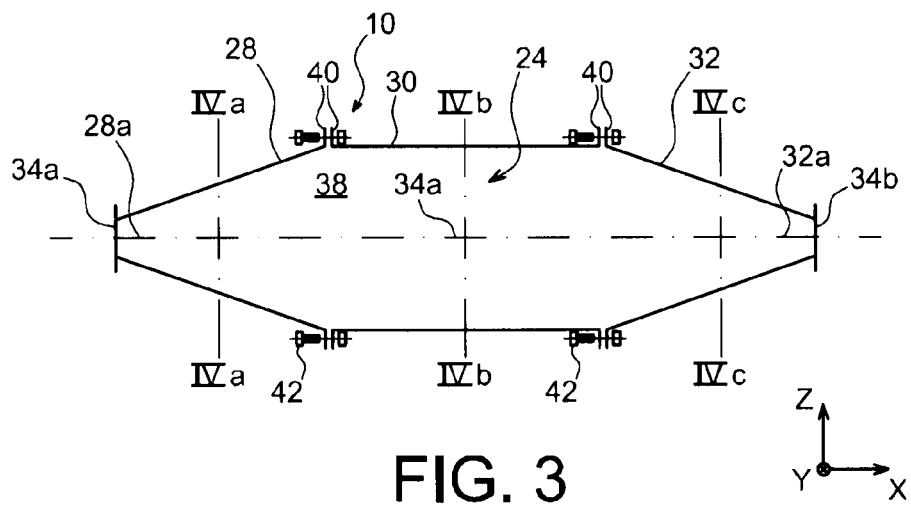
FIG. 3 shows a longitudinal sectional view of the rigid structure of the attachment pylon shown in FIG. 2.

As shown diagrammatically in FIG. 3, the box forming the rigid structure 10 may also comprise a forward transverse box closing rib 34a, and an aft transverse box closing rib 34b.

Figure 2:
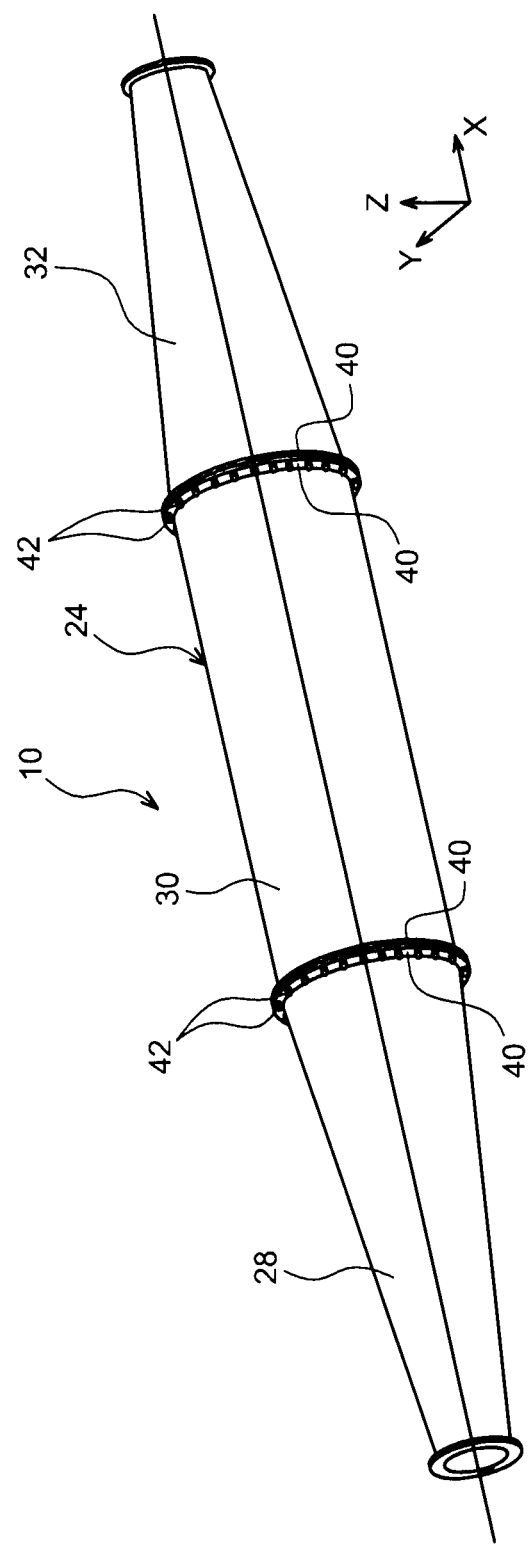
FIG. 2 shows a perspective view of the rigid structure of the engine assembly attachment pylon shown in FIG. 1.

The forward and/or aft ends of each of the segments 28, 30, 32 will be in the form of an attachment flange projecting outwards from a space inside the box 38, so each of these segments can be connected to the next segment. Therefore, these coaxial circular flanges 40 centred on the segment axes preferably bear in contact with the adjacent flange and project radially outwards from the segments. FIGS. 2 and 3 show that the aft flanged end 40 of the forward segment 28 is fixed to the flanged forward end 40 of the central segment 30, and similarly the aft flanged end 40 of the central segment 30 is fixed to the flanged forward end 40 of the aft segment 32. The attachment means used to make such assemblies are bolts 42, or rivets or similar means, placed outside the box 38, and are preferably oriented along the X direction.

Figure 5:
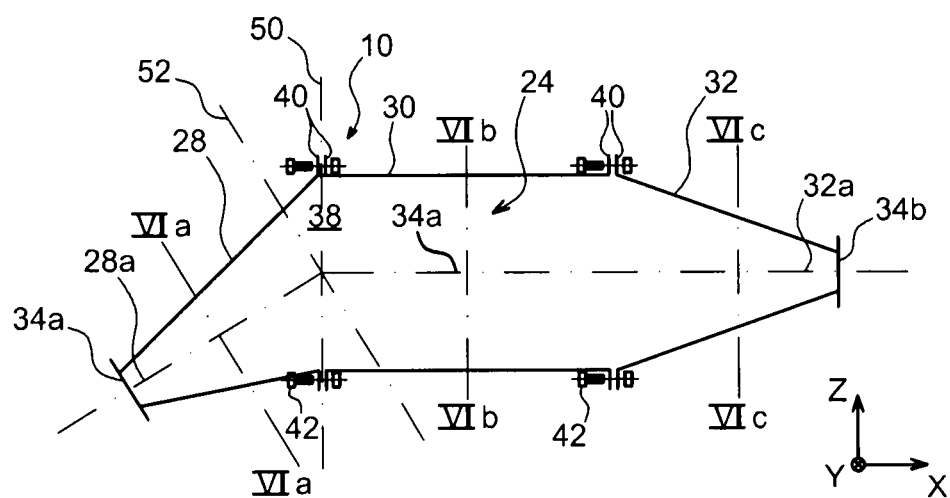
FIG. 5 shows a view similar to that shown in FIG. 3, in which the rigid structure is in the form of another preferred embodiment of this invention.
Figure 6A:
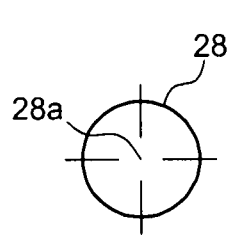
FIGS. 6a to 6c are sectional views taken along lines VIa-VIa to VIc-VIc in FIG. 5 respectively.
Figure 6B:
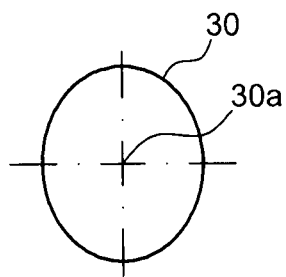
Figure 6C:
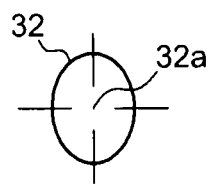

According to one preferred embodiment shown in FIGS. 5 to 6c, the rigid structure 10 of the attachment pylon is also globally composed of a box 24 extending over the entire length of the rigid structure 10 along the X direction, and therefore forming a torsion box. This box is composed of several hollow segments, in this case three adjacent segments 28, 30, 32. The first of these segments is tapered and truncated, with its axis 28a corresponding to the axis of revolution. Its forward end is preferably designed to support the forward engine attachment 6. The section orthogonal to the axis 28a is in the shape of a circle as shown in FIG. 6a. Thus, the size of this circle reduces towards the forward end due to the reduction in size of the tapered segment along this direction.

The second hollow segment 30 called the central segment is approximately cylindrical with its axis 30a inclined to and intersecting the axis 28a. More precisely, the axis 30a of the central segment is approximately parallel to the X direction, the axis 28a being inclined relative to it so that the distance between it and the engine axis 5 becomes smaller further forwards. In any case, the two intersecting axes 28a, 30a are preferably located in an imaginary vertical XZ median plane of the pylon.

The forward end of this central segment, fixed to the aft end of the first segment 28, is preferably designed to support the aft engine attachment 8. The section orthogonal to the axis 30a is in the shape of an ellipse as shown in FIG. 6b. Therefore, the major axis of this ellipse lies along the vertical direction and the modulus of inertia of the segment in this direction is very large. Advantageously, the vertical direction is the direction in which the mechanical loads applied to the pylon to resist engine forces are greatest.

Preferably, the aft end of the segment 28 is located in a plane 50 inclined relative to the plane 52 orthogonal to the axis 28a to facilitate assembly of segments 28 and 30 to each other, and to have an ellipse shape very similar to the ellipse shape of the second segment 30. Preferably, the plane 50 concerned is almost orthogonal to the axis 30a of the main segment 30, and also corresponds to the plane in which the forward end of the main segment 30 is located.

Finally, the third segment 32 is significantly tapered and truncated, with its axis 32a corresponding to the axis 30a and also forming an axis of revolution. The section orthogonal to the axis 32a is in the shape of an ellipse as shown in FIG. 6c.

Thus, the size of this ellipse reduces towards the aft end due to the reduction in size of the tapered section along this direction, which is perfectly adapted to the narrowing of the pylon is this aft part. Once again, to facilitate assembly of segments 30 and 32 to each other, the elliptical section of the second segment 30 is very similar to the section of the third segment 32 close to its forward end.

Obviously, the segments are connected to each other by attachment means 42 described above passing through the flanges 40 bearing on and being in contact with each other and arranged outside the space 38.

Furthermore, regardless of the envisaged embodiment, this inner space 38 forms a duct through which compressed air drawn off from the engine can pass as an air supply to the aircraft.

Obviously, those skilled in the art could make various modifications to the assembly 1 and to the aircraft attachment pylon 4 that have just been described, solely as non-limitative examples. In this respect, it is worth mentioning that although the pylon 4 has been presented in an adapted configuration for it to be suspended under the aircraft wing, this pylon 4 could also be presented in a different configuration so that it could be mounted above this wing, and possibly even in the aft part of the aircraft fuselage.

The invention claimed is:

1. An engine attachment pylon for an aircraft, the pylon comprising:
    a rigid structure including a box formed by at least one hollow segment,
    wherein a section of the at least one hollow segment is elliptical or circular in shape,
    wherein the at least one hollow segment includes
        a forward hollow segment with a tapered and truncated circular cross-section, and
        a central hollow segment supporting the forward segment, and
    wherein the central hollow segment is approximately cylindrical in a form of an ellipse with an inclined axis intersecting an axis of the forward segment.

2. The pylon according to claim 1, wherein the forward hollow segment and the central hollow segment are connected to each other at respective forward and aft ends thereof.

3. The pylon according to claim 2, wherein the forward hollow segment and the central hollow segment each include an attachment flange projecting outwards from a space inside the box.

4. The pylon according to claim 3, wherein the forward hollow segment and the central hollow segment are assembled to each other via respective attachment flanges bearing on each other, and
    wherein the forward hollow segment and the central hollow segment are fixed to each other by attachment means outside the space inside the box.

5. An engine attachment pylon for an aircraft, the pylon comprising:
    a rigid structure including a box formed by a plurality of hollow segments,
    wherein a first segment of the plurality of hollow segments is a forward hollow segment, the forward hollow segment having a tapered and truncated profile,
    wherein a second segment of the plurality of hollow segments is a central hollow segment, the central hollow segment supporting the forward hollow segment, and
    wherein an entire cross-section of the forward hollow segment is circular, and an entire cross-section of the central hollow segment is elliptical.

6. The pylon according to claim 5, wherein the plurality of hollow segments are connected to each other at respective forward and aft ends thereof.

7. The pylon according to claim 6, wherein the plurality of hollow segments each include at least one attachment flange projecting outwards from a space inside the box.

8. The pylon according to claim 7, wherein the plurality of hollow segments are assembled to each other via the attachment flanges bearing on each other, and
  wherein the plurality of hollow segments are fixed to each other by attachment means outside the space inside the box.

9. The pylon according to claim 5, further wherein the central hollow segment has a central axis,
  wherein the central axis intersects a forward axis of the forward hollow segment, and
  wherein the forward axis is inclined with respect to the central axis.

10. The pylon according to claim 5, wherein a major axis of the elliptical cross-section of the central hollow segment is vertically perpendicular to an engine central axis.

11. The pylon according to claim 5, wherein a third segment of the plurality of hollow segments is an aft hollow segment, and
  wherein an entire cross-section of the aft hollow segment is elliptical or circular.

12. The pylon according to claim 11, wherein a major axis of the elliptical cross-section of the aft hollow segment is vertically perpendicular to an engine central axis.

13. An engine attachment pylon for an aircraft, the pylon comprising:
  a rigid structure including a box formed by a plurality of hollow segments,
  wherein an entire cross-section of each of the plurality of hollow segments is elliptical or circular,
  wherein each of the plurality of hollow segments has at least one facing attachment flange, and
  wherein each facing attachment flange projects outwards from a space inside the box and has a corresponding elliptical or circular cross-section.

14. The pylon according to claim 13, wherein the plurality of hollow segments are connected to each other via respective facing attachment flanges, the facing attachment flanges being fixed to each other by attachment means outside an exterior of the plurality of hollow segments.

15. The pylon according to claim 14, wherein the attachment means includes bolts or rivets.

16. The pylon according to claim 13, wherein at least one of the plurality of hollow segments is a tapered and truncated cone.

17. The pylon according to claim 13, wherein the plurality of hollow segments includes:
  a first hollow segment with a first central axis; and
  a second hollow segment with a second central axis,
  wherein the second central axis is parallel to a turbojet central axis, and
  wherein the first central axis is inclined relative to the second central axis and to the turbojet central axis.

18. The pylon according to claim 17, wherein the second hollow segment has an elliptical cross-section orthogonal to the second central axis.

19. The pylon according to claim 18, wherein a major axis of the elliptical cross-section of the second hollow segment is vertically perpendicular to the turbojet central axis.

20. The pylon according to claim 17, wherein the plurality of hollow segments further includes a third hollow segment with a third central axis and an elliptical cross-section, the elliptical cross-section tapering and reducing in size in an aft direction of the turbojet central axis.

* * * * *